(12) United States Patent
Schneider

(10) Patent No.: US 6,688,643 B2
(45) Date of Patent: *Feb. 10, 2004

(54) INFLATABLE AIRBAG BOLSTER PANEL RETENTION APPARATUS

(75) Inventor: David W. Schneider, Waterford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/800,363

(22) Filed: Mar. 6, 2001

(65) Prior Publication Data

US 2002/0125708 A1 Sep. 12, 2002

(51) Int. Cl.$^7$ ............................................. B60R 21/04
(52) U.S. Cl. .................. 280/753; 280/728.3; 280/730.1
(58) Field of Search ....................... 280/751, 753, 280/730.1, 728.1, 728.3

(56) References Cited

U.S. PATENT DOCUMENTS

| | | | | |
|---|---|---|---|---|
| 4,902,037 A | * | 2/1990 | Groce | 280/751 |
| 5,201,544 A | * | 4/1993 | Matano et al. | 280/751 |
| 5,344,184 A | * | 9/1994 | Keeler et al. | 280/730 |
| 5,536,043 A | | 7/1996 | Lang et al. | |
| 5,570,901 A | * | 11/1996 | Fyrainer | 280/730.1 |
| 5,626,358 A | * | 5/1997 | Ricks et al. | 280/731 |
| 5,630,621 A | | 5/1997 | Schneider | |
| 5,775,729 A | * | 7/1998 | Schneider et al. | 280/730.1 |
| 5,816,613 A | * | 10/1998 | Specht et al. | 280/753 |
| 5,927,755 A | * | 7/1999 | Matsuo et al. | 280/752 |
| 5,931,493 A | * | 8/1999 | Sutherland | 280/730.1 |
| 6,039,380 A | * | 3/2000 | Heilig et al. | 296/70 |
| 6,131,950 A | * | 10/2000 | Schroter | 280/753 |
| 6,170,871 B1 | * | 1/2001 | Goestenkors et al. | 280/743.1 |
| 6,186,546 B1 | * | 2/2001 | Uhl | 280/751 |
| 6,213,497 B1 | * | 4/2001 | Spencer et al. | 280/730.1 |
| 6,299,209 B1 | * | 10/2001 | Ankersson et al. | 280/753 |
| 6,305,710 B1 | * | 10/2001 | Bosgieter et al. | 280/753 |
| 6,338,501 B1 | * | 1/2002 | Heilig et al. | 280/753 |
| 6,340,170 B1 | * | 1/2002 | Davis et al. | 280/730.1 |
| 6,345,838 B1 | * | 2/2002 | Schneider | 280/730.1 |
| 6,378,902 B2 | * | 4/2002 | Unger et al. | 280/753 |
| 6,431,583 B1 | * | 8/2002 | Schneider | 280/728.2 |
| 6,517,103 B1 | * | 2/2003 | Schneider | 280/730.1 |

FOREIGN PATENT DOCUMENTS

| | | | |
|---|---|---|---|
| DE | 3908713 | * | 10/1989 |
| DE | 3934588 | * | 4/1991 |

* cited by examiner

Primary Examiner—Paul N. Dickson
Assistant Examiner—Deanna Draper
(74) Attorney, Agent, or Firm—James D. Erickson; Sally J. Brown

(57) ABSTRACT

A load distribution panel retention apparatus which effectively secures a knee bolster airbag to a load distribution panel. The apparatus includes a flat, rectangular piece of textile material attached to a knee bolster airbag to form a panel retainer which is open on both ends. A load distribution panel, also called a knee bolster panel, is secured to the airbag by positioning the load distribution panel between the panel retainer and the airbag. The apparatus includes a housing secured to the instrument panel or to a firewall of a vehicle. The conventional inflatable knee airbag is stored within the housing and in communication with an inflator. The inflator is stored within the housing and inflates the knee airbag in an accident situation. A trim cover panel is attached to the load distribution panel to provide a decorative covering of the airbag module.

22 Claims, 4 Drawing Sheets

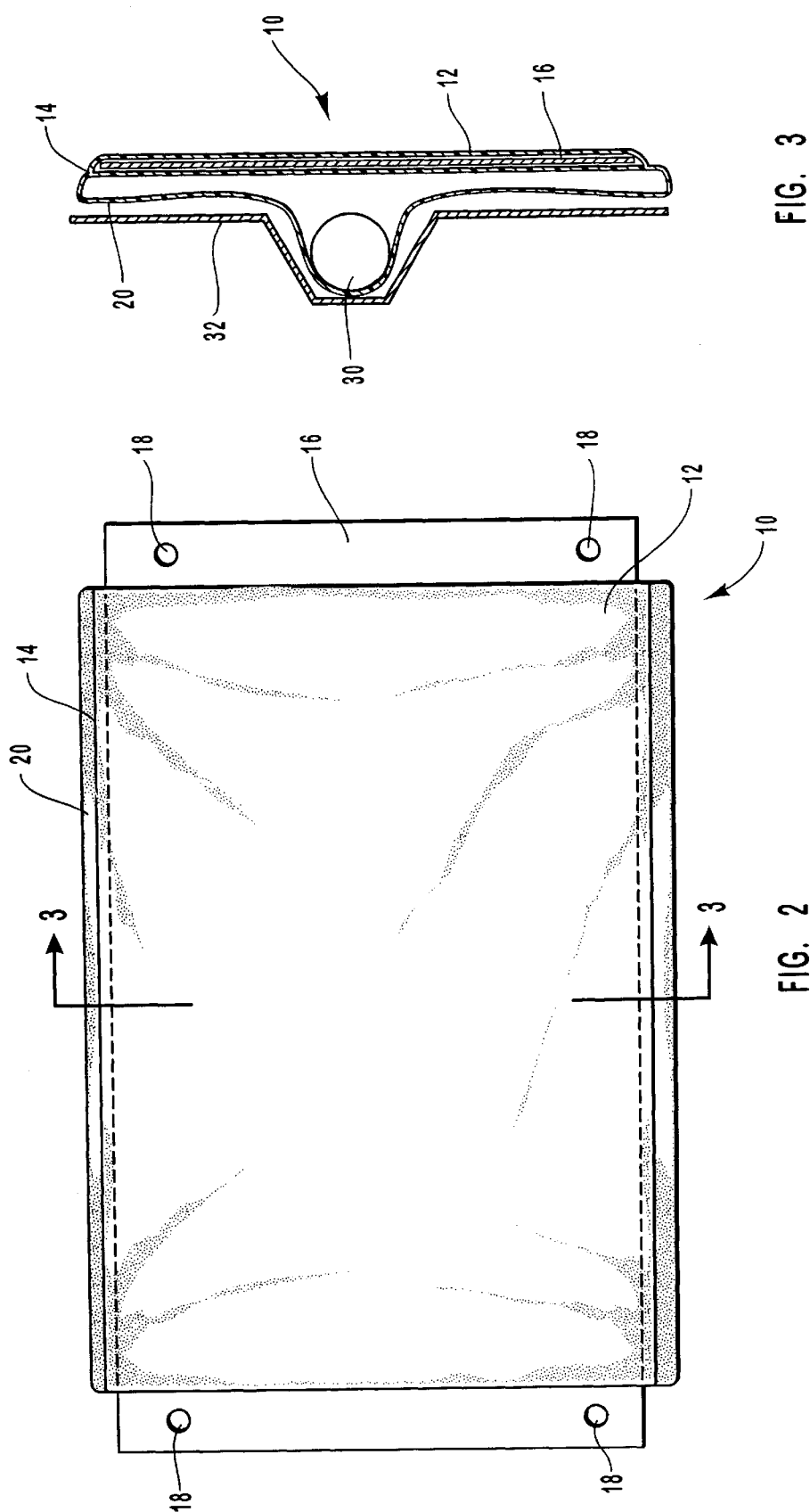

INFLATABLE AIRBAG BOLSTER PANEL RETENTION APPARATUS

BACKGROUND OF THE INVENTION

1. The Field of the Invention

The present invention relates to airbag inflation systems in motor vehicles. More specifically, the invention relates to a panel retainer for securing a bolster panel to an airbag.

2. Technical Background

Inflatable airbags are well accepted for use in motor vehicles and have been credited with preventing numerous deaths and accidents. Some statistics estimate that frontal airbags reduce the fatalities in head-on collisions by 25% among drivers using seat belts and by more than 30% among unbelted drivers. Statistics further suggest that with a combination of seat belt and airbag, serious chest injuries in frontal collisions can be reduced by 65% and serious head injuries by up to 75%. Airbag use presents clear benefits and vehicle owners are frequently willing to pay the added expense for airbags.

A modern airbag apparatus may include an electronic control unit (ECU) and one or more airbag modules. The ECU is usually installed in the middle of an automobile, between the passenger and engine compartment. If the vehicle has a driver airbag only, the ECU may be mounted in the steering wheel. The ECU includes a sensor which continuously monitors the acceleration and deceleration of the vehicle and sends this information to a processor which processes an algorithm to determine if the vehicle is in an accident situation.

When the processor determines that there is an accident situation, the ECU transmits an electrical current to an initiator in the airbag module. The initiator triggers operation of the inflator or gas generator which, in some embodiments, uses a combination of compressed gas and solid fuel. The inflator inflates a textile airbag to impact a passenger and prevent injury to the passenger. In some airbag apparatuses, the airbag may be fully inflated within 50 thousandths of a second and deflated within two tenths of a second.

An airbag cover, also called a trim cover panel, covers a compartment containing the airbag module and may reside on a steering wheel, dashboard, vehicle door, vehicle wall, or beneath the dash board. The airbag cover is typically made of a rigid plastic and may be forced opened by the pressure from the deploying airbag. In deploying the airbag, it is preferable to retain the airbag cover to prevent the airbag cover from flying loose in the passenger compartment. If the airbag cover freely moves into the passenger compartment, it may injure a passenger.

Airbag apparatuses have been primarily designed for deployment in front of the torso of an occupant between the upper torso of an occupant and the windshield or instrument panel. Conventional airbags, such as driver's or passenger airbags (hereinafter referenced as the "primary airbag"), protect the occupant's upper torso and head from colliding with a windshield or instrument panel. During a front end collision, if the occupant is restrained by a seat belt, the occupant's upper torso bends at the waist and hits the primary airbag. However, depending on the design of the vehicle seat and force of the collision, there is a tendency for an occupant to slide forward along the seat and slip below the primary airbag, falling to the feet and leg compartment of the vehicle. The tendency is pronounced when the occupant is not properly restrained by a seat belt. Sliding of the occupant below the primary airbag is referred to as "submarining". When the occupant submarines, the primary airbag is less effective in protecting the occupant. Submarining is but one example of instances where extra support is needed to protect occupants or goods in an accident situation.

Submarining is more prevalent in vehicles which have large leg room compartments. Vehicles which have restricted leg room, such as sports cars, have a lower submarining tendency. In vehicles like sports cars, the distance between the legs and knees of the occupant and the instrument panel is shorter than the distance in vehicles like sport utility vehicles or trucks. In an accident in a sports car, the knees of the occupant often strike the instrument panel. The instrument panel prevents submarining. Generally, the material of the sports car instrument panel deforms to some degree to help protect the legs and knees of the occupant.

In order to prevent submarining in vehicles with large leg room compartments, a knee airbag system has been developed. The goal of the knee airbag system is, during an accident, to position a piece of rigid material similar to the material of the instrument panel in a sports car close to the occupant's knees and legs creating leg and knee support, which prevents submarining. The knee airbag system allows a vehicle manufacturer to design vehicles with more leg room and still have safety comparable to that of vehicles with less leg room. To accomplish the goal, the knee airbag system is typically positioned in the lower portion of the instrument panel.

The knee airbag system includes an inflator, a housing, an airbag, and a trim cover panel. The housing is a conventional enclosure for securing the knee airbag components to the vehicle. The housing stores the knee airbag system components while the airbag is deflated and not needed. The inflator, once triggered, uses compressed gas, solid fuel, or their combination to produce rapidly expanding gas to inflate the airbag. As with conventional airbag systems, an airbag is a large textile bag which the gas inflates like a balloon. The knee airbag system may also include a fixed panel, called a load distribution panel or knee bolster panel. This bolster panel is important in providing sufficient support such that submarining is prevented.

In a system using a knee bolster airbag, a primary airbag provides a cushioning effect which protects the occupant's face and head. In such a system, the knee airbag serves to restrain the legs and knees. However, without additional rigid support, the cushioning effect of the knee airbag allows the knees and legs to move a sufficient distance that submarining may still occur.

When an inflated knee airbag without rigid support contacts the legs, the flexible material of the airbag wraps around each leg. The surface area of the inflated knee airbag supporting the legs is reduced to the area where each leg contacts the knee airbag. If the force of the forward moving legs is distributed across the entire surface of the airbag, however, then the entire volume of gas in the airbag will compress resulting in more support of the legs. For this reason, a rigid support surface or "load distribution panel" is generally used in connection with a knee airbag. When such a load distribution panel is used the compressed volume of gas within the airbag creates a greatly increased opposing force pushing against the forward moving legs.

The load distribution panel is generally made of foam and hard plastic surrounding a metal substrate. The shape of the inflated airbag determines how to secure the load distribution panel. Since, the inflated knee airbag occupies a generally rectangular volume of the vehicle leg compartment, the load distribution panel is preferably rectangular. Optimal distribution of the impact force, through the volume of the inflated knee airbag, is accomplished preferably by securing each corner of the rectangular load distribution panel to the knee airbag.

Generally, the load distribution panel is secured to the front of the airbag to distribute the force of impact through the majority of the volume of gas in the inflated airbag. Securement of a load distribution panel and an airbag is a challenge because of the strong impact forces involved, the flexibility of the airbag, and the rigidity of the load distribution panel. Apparatus for securing the knee bolster panel to the knee airbag exist. For example, a load distribution panel may have threaded studs which pass through holes in the knee airbag. The studs then pass through holes in a retaining plate. The studs are secured to the retaining plate by nuts screwed onto the studs.

Another securement technique uses textile tethers installed completely inside the airbag. The tethers comprise sewn loops on each end. Each end of the tether is secured by a rivet or screw attached to a ring, similar to a key ring. The loop of the tether is connected to the ring in the same way keys are attached to key rings. One rivet attaches to the inflator or housing. The other rivet passes through a hole in the airbag to the outside and attaches to a load distribution panel.

A third securement technique uses rods and channels. The airbag is provided with rods which are secured using conventional means which include sewing, glueing, welding, and the like. The rods are secured so the majority of the rod is exposed and runs the length of the airbag. The load distribution panel comprises C-shaped channels which correspond in size and length to the rods on the airbag. The rods and channels are made of nylon, metal, of other engineering polymer. The load distribution panel is attached by snapping the C-shaped channels to the exposed portion of the rods.

These designs all have significant limitations because airbag modules are generally assembled prior to installation in the vehicle. Securing the airbag using a retaining plate and studs requires careful positioning of the studs through the retaining plate. Additionally, the attachment and tightening of the nuts onto the studs is challenging because attachment occurs inside the airbag by way of a hole intended to allow insertion of the inflator. Similarly the tether technique attaches the tethers at points internal to the airbag. Such precision requires extra skill and time in assembling the module. The rod and channel technique is external to the airbag, yet has several parts. Attaching some of the parts may require special tools such as a press, welder, or rivet gun. When a system has several parts, particularly ones requiring extra time and skill to attach, the probability of defective parts or defective installation rises. If too high, these probabilities prevent the manufacturer from using an assembly line.

Accordingly, it would be an advancement in the art to provide a load distribution panel retention apparatus which is easier to fabricate. A further advancement in the art would be to provide a load distribution panel retention apparatus which allows for quick and simple attachment of the load distribution panel to the airbag. It would be another advancement in the art to provide a load distribution panel retention apparatus that saves time and money. The present invention solves these problems in a novel and useful way.

BRIEF SUMMARY OF THE INVENTION

The apparatus and method of the present invention has been developed in response to the present state of the art, and in particular, in response to the problems and needs in the art that have not yet been fully solved by currently available load distribution panel retention apparatuses. Thus, the present invention provides a load distribution panel retention apparatus which provides easy attachment of a knee bolster panel and saves both time and money.

As mentioned above, in order for knee bolster airbag systems to operate effectively it is necessary to provide rigidity to the airbag. This is required in order to distribute the load over the entire volume of gas inside the inflated airbag. This load distribution function is provided herein by a load distribution panel. As further discussed above, it has been a problem in the art to adequately attach a load distribution panel to an airbag. The present invention provides an improved mechanism of attachment.

In one embodiment of the present invention, the load distribution panel retention apparatus comprises a planar piece of material, (hereinafter sometimes referred to as a "Panel Retainer"). The material is typically a nylon or polyester weave and may be in the shape of a square or rectangle. The panel retainer is configured to receive a load distribution panel. The panel retainer provides uniform securement of a load distribution panel to a knee airbag. The panel retainer is secured to the airbag along at least two of it's opposing edges. Techniques for securement of the edges include, but are not limited to, glueing, velcro, sewing, welding, snapping, and the like. The panel retainer may be in the form of a sleeve or pocket. As a pocket, the panel retainer is secured along three edges to the airbag. As a sleeve, the panel retainer is rectangular in shape, rather than square.

The panel retainer may be configured to receive load distribution panels of various shapes and forms. For example, the load distribution panel could be in the shape of a rod, a plate, or a panel. The shape and form of the load distribution panel dictates the distance between the secured edges of the panel retainer. Alternatively, the panel retainer may be configured to receive a securing member of a load distribution panel, which securing member may be in the form of an arm, tab or flange.

In further embodiments, the invention may include one or more pieces of material in the form of straps. The straps are secured at each end to the airbag by way of conventional securement techniques described above. The straps are configured to receive and secure a load distribution panel. These straps may be oriented in parallel or criss-cross each other.

The present invention may also include one or more holes in the panel retainer to allow passage of decorative trim cover fasteners. The fasteners pass through the holes to secure the load distribution panel to a decorative trim cover panel. The size and position of the holes corresponds to the size and position of the fasteners.

The present invention further provides a method of knee airbag module assembly. In the method of the present invention, an airbag is provided. The airbag includes a planar panel retainer capable of receiving a load distribution panel. Also provided is a load distribution panel, a trim cover panel, and trim cover panel fasteners. The method includes placing the load distribution panel between the panel retainer and the airbag. The load distribution panel comprises one or more fasteners disposed therein. In other embodiments, the one or more fasteners are disposed in the trim cover panel. The fasteners are of the kind conventional in the art. i.e. tree clips, snaps, rivets, or the like. The fasteners are fit through holes in the panel retainer. Finally, the trim cover panel is attached to the load distribution panel by way of the fasteners.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages of the invention are obtained and be readily understood, a more particular description of the invention briefly described above will be rendered by reference to specific embodiments thereof which are illustrated in the appended drawings. Understanding that these drawings depict only typical embodiments of the invention, and are not therefore to be considered to be limiting of its scope, the invention will be described and explained with additional specificity and detail through the use of the accompanying drawings in which:

FIG. 1 illustrates the preferred position of a vehicle occupant, and the location of a primary airbag module and a knee airbag module.

FIG. 2 is a front elevation view of one embodiment of the present invention illustrating the load distribution panel, panel retainer, and fastener locations.

FIG. 3 is a cross-sectional view along line 3—3 of FIG. 2. FIG. 3 illustrates the position of the airbag housing, the airbag, the inflator, the load distribution panel, and the panel retainer in relation to each other.

FIG. 6 illustrates the position of a decorative trim cover panel and fasteners protruding from the load distribution panel and into receiving holes in the trim cover panel together with the other elements of the knee airbag module.

FIG. 7 illustrates the position of a decorative trim cover panel and fasteners protruding from the trim cover panel and into receiving holes in the load distribution panel together with the other elements of the knee airbag module.

DETAILED DESCRIPTION OF THE PREFERRED EMBODIMENTS

The present invention can be better understood with reference to the drawings where like parts are designated with like numerals throughout.

Figure 1:
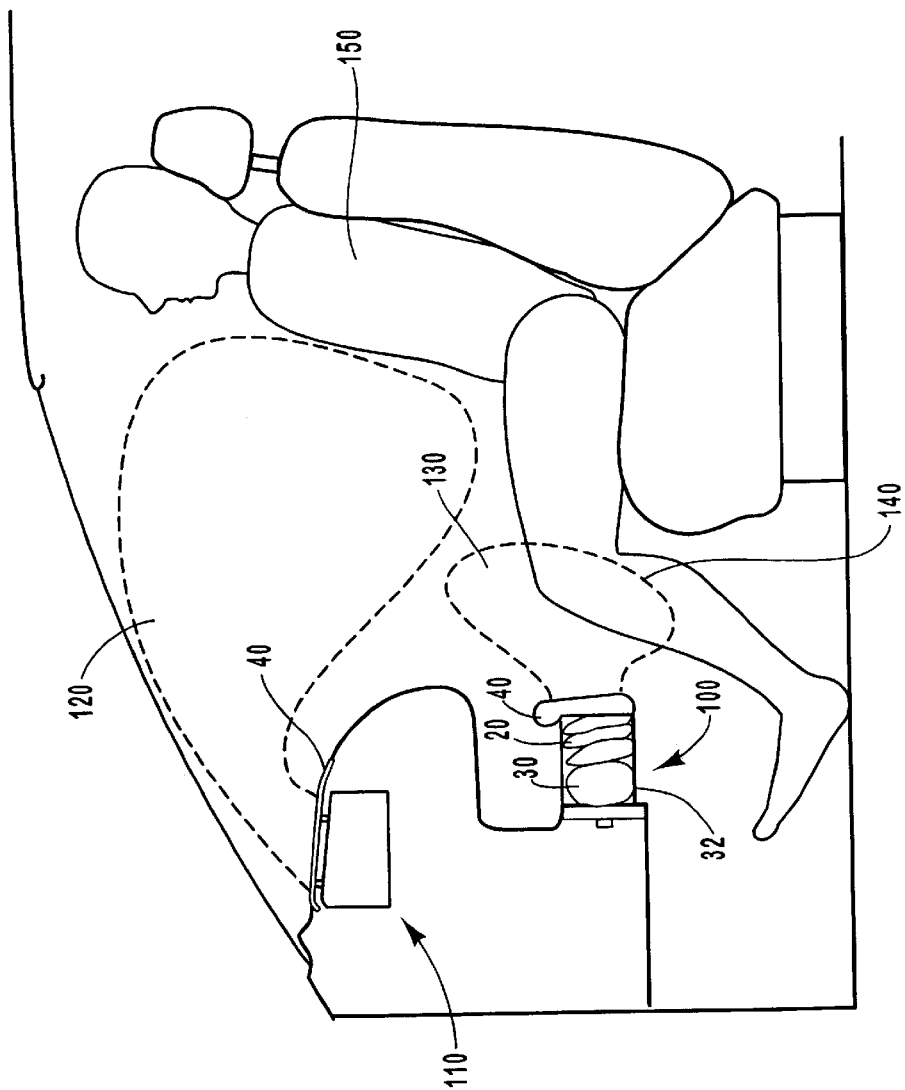
FIG. 1 is a cross-sectional view of a vehicle provided with a primary airbag module and a knee airbag module.

FIG. 1 is a cross-sectional view of a vehicle provided with a knee airbag module 100 and a primary airbag module 110. The primary airbag module 110 and knee airbag module 100 are illustrated as they appear when storing the un-inflated airbag 20. FIG. 1 illustrates the area the inflated primary airbag 120 and inflated knee airbag 130 occupy. The preferred location of the occupant's legs 140 and upper torso 150 are also illustrated. Other components of the knee airbag module 100 include: the inflator 30, the housing 32, and the trim cover panel 40. These other conventional airbag components are generally found in primary and knee airbag systems.

As illustrated in FIG. 2, the present invention relates to an improved knee bolster panel retention apparatus 10. As discussed above, airbag manufacture and assembly can be very costly in terms of manufacturing time and cost of skilled laborers. As a result, there is a need in the art for improvements to airbag modules, and more particularly the knee bolster panel retention apparatus, to provide a more economical and simple apparatus to reduce costs. The present invention is related to providing such advancements in the design and construction of load distribution panel retention apparatuses.

FIG. 2 is a front elevation view of a knee bolster panel retention apparatus 10 falling within the scope of the present invention. The knee bolster panel retention apparatus 10 includes a panel retainer 12. The panel retainer 12 provides uniform securement of a load distribution panel 16. Uniform securement provides presentation of a stable load distribution panel 16 to prevent submarining in an accident.

The load distribution panel 16 provides a larger and more rigid surface to distribute and absorb the force of the legs and knees than knee airbag systems without load distribution panels 16. The larger rigid surface allows less travel of the legs and knees in an accident which prevents submarining. The load distribution panel 16 is preferably a rectangular shaped panel. Alternatively, the load distribution panel 16 may be a thin rigid rectangular plate, a rod having a polygonal cross-section, or other similarly shaped material. To conserve space and reduce weight, the rigid load distribution panel 16 is preferably made as strong and as light as possible. Typically, the load distribution panel 16 is made from wood, metal, Styrofoam®, hard plastic, or the like surrounding a metal or hard plastic substrate.

The panel retainer 12 secures the load distribution panel 16 to the airbag 20 which allows the force of the inflating airbag to position the load distribution panel 16 in proximity to the occupant's legs. The panel retainer 12 retains the load distribution panel 16 so the load distribution panel 16 and the airbag 20 may cooperate to resist the forward momentum of the occupant. The panel retainer 12 is preferably made from the same material as the airbag 20. The panel retainer 12 may be a piece of material attached to the airbag 20 or a woven component of the airbag 20. The panel retainer 12 is disposed on the airbag 20 so the load distribution panel 16, which is generally rectangular in shape, is secured at four corners. Securement at four corners of the load distribution panel 16 provides the uniform securement discussed above.

The position of the panel retainer 12 is dictated by the desired position of the load distribution panel 16. Generally, the load distribution panel 16 is positioned on the deflated airbag 20 such that when the airbag 20 is inflated the load distribution panel 16 is in close proximity to the occupant's legs. Therefore, the load distribution panel 16 is preferably centered on the airbag 20, which is positioned in the lower portion of the instrument panel of the vehicle. The panel retainer 12 is secured to the airbag 20 along at least two opposite edges to form a seam 14 between the airbag 20 and the panel retainer 12. Securement is accomplished by way of glueing, velcro, sewing, welding, snapping, and the like.

Figure 5:
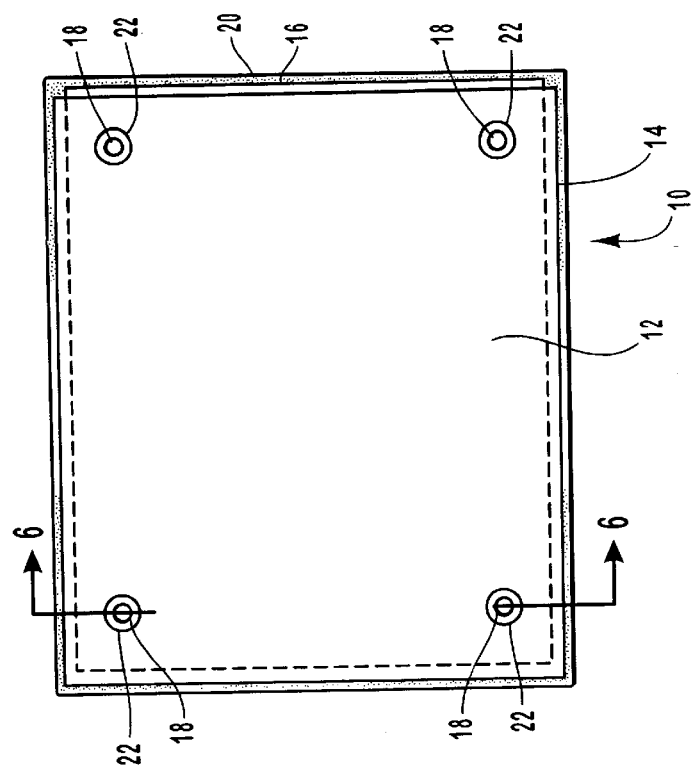
FIG. 5 is a front elevation view of one embodiment of the present invention illustrating the panel retainer embodied as a pocket.
Figure 4:
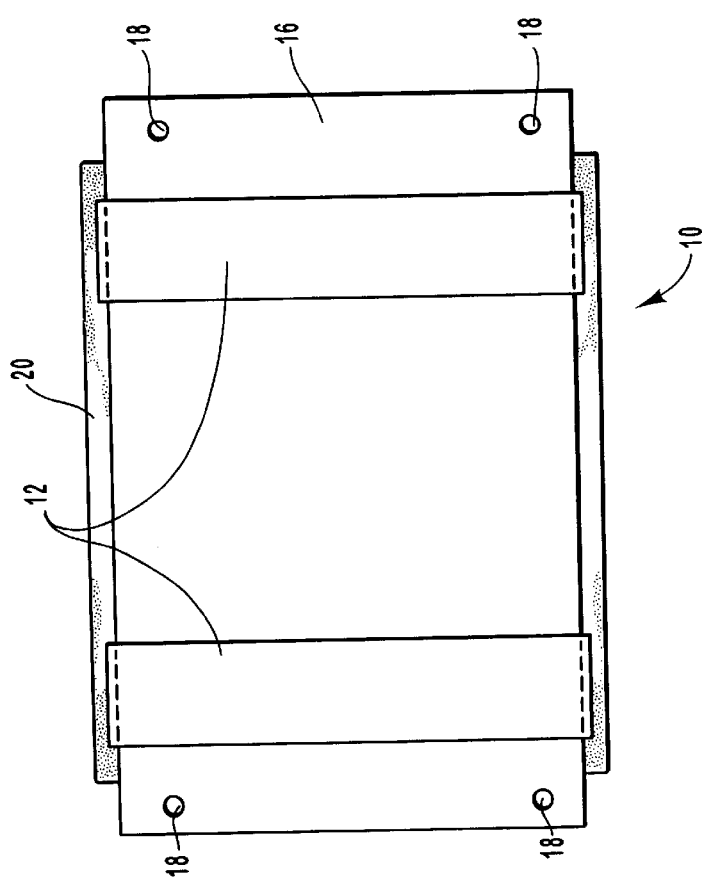
FIG. 4 is a front elevation view of one embodiment of the present invention illustrating the panel retainer embodied as a plurality of straps.

The size and shape of the panel retainer 12 is necessarily determined by the shape of the load distribution panel 16. The load distribution panel 16 is preferably rectangular in shape. Therefore, the panel retainer 12 is preferably rectangular. The particular embodiment of the panel retainer 12 also effects its shape. For example, an embodiment of the panel retainer 12 as a sleeve, a plurality of straps, or pocket requires that the panel retainer 12 be shaped as illustrated in FIGS. 2, 4, and 5 respectively. FIG. 2 illustrates the panel retainer 12 sized as a sleeve in relation to the load distribution panel 16.

Referring to FIG. 4, the panel retainer 12 is illustrated embodied as a plurality of straps 12. The straps 12 are sized and positioned such that together they secure the four corners of the load distribution panel 16. The straps 12 are preferably positioned towards the ends of the load distribution panel 16. The straps 12 are secured to the airbag 20 preferably by way of stitches (not shown) along their short edges. The load distribution panel 16, fasteners 18, and airbag 20 are also illustrated.

Figure 6:
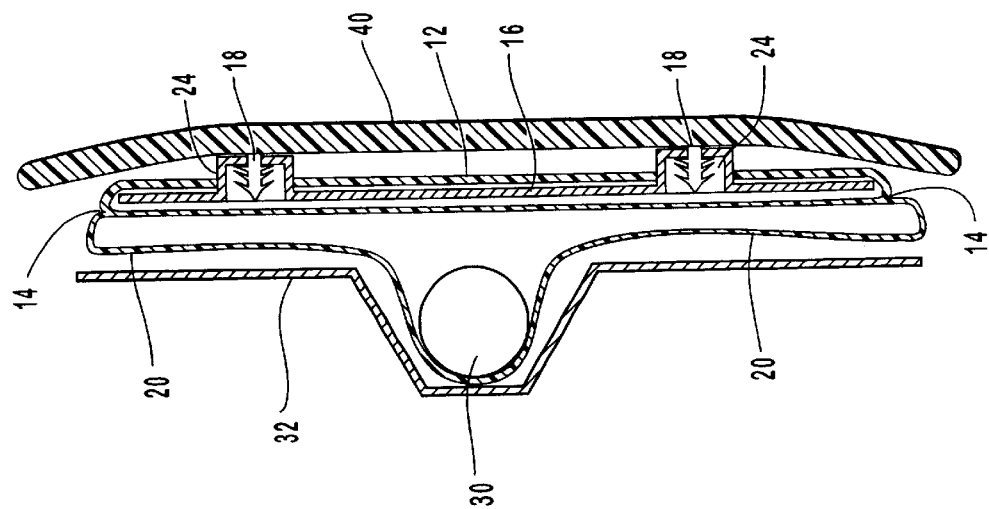
FIG. 6 is a cross-sectional view along line 6—6 of FIG. 5.

Referring to FIG. 5, the panel retainer 12 is illustrated sized to form a pocket for receiving the load distribution panel 16. The panel retainer 12 is positioned towards one end of the load distribution panel 16 and secured along three of its four edges. The fourth, unsecured, edge of the panel retainer 12 allows the load distribution panel 16 to be positioned inside the panel retainer 12. In the illustrated embodiment, the panel retainer 12 may have one or more apertures 22. The apertures 22 allow the fasteners 18 to pass through the panel retainer 12 and engage the fastener receiving members 24, as seen in FIG. 6. The apertures 22 are sized and positioned to correspond to the position and size of the fasteners 18.

In an alternative embodiment of the present invention (not shown), the panel retainer 12 may be sized and shaped to receive a securing flange (not shown) which extends from the load distribution panel 16. This flange (not shown) may be in the form of an arm or tab formed as part of, or attached to, a load distribution panel 16. Additionally, the alternative embodiment may have a plurality of panel retainers 12 configured to operably receive a plurality of flanges.

Figure 7:
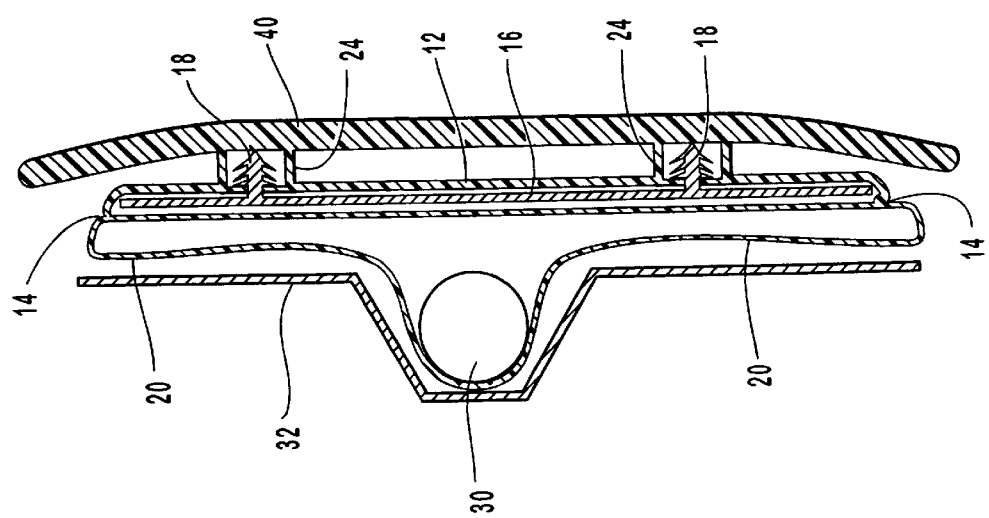
FIG. 7 is a cross-sectional view along line 6—6 of FIG. 5.

Referring to FIG. 5, the load distribution panel 16 comprises one or more fasteners 18. The fasteners 18, as illustrated in more detail in FIGS. 6 and 7, secure the trim cover panel 40 to the load distribution panel 16. Fasteners 18 are well known in the art and may include rivets, screws, tree rivets, and the like. As illustrated in FIGS. 6 and 7, the fasteners 18 join with fastener receiving members 24 during assembly. A fastener receiving member 24 is the corresponding member of a fastener 18, which makes the fastener 18 operable. Fastener receiving members 24 may be a receiving pedestal of a button or a hole for receiving a rivet, tree rivet, or screw. Fastener receiving members 24 embodied as holes are illustrated in FIGS. 2 and 4.

The components described above comprise the knee bolster panel retention apparatus 10. In order to practice the present invention, an airbag 20 is provided. The airbag 20 is a textile bag common in the industry. The airbag 20 is sized and shaped to operably position the load distribution panel 16 in close proximity to the occupant's legs. A panel retainer 12 is secured to the airbag 20 forming one or more seams 14. The panel retainer 12 is secured using conventional techniques discussed above. A load distribution panel 16 is placed between the airbag 20 and the panel retainer 12. With the load distribution panel 16 in place, final assembly of the knee airbag module is begun. The airbag 20 is folded and positioned into the space between the load distribution panel 16 and an inflator 30 of the knee airbag module. (Illustrated in FIG. 3.) The trim cover panel 40 attaches to the load distribution panel 16 by way of the fasteners 18 and fastener receiving members 24. The result is a fully assembled airbag module ready to be secured to the fire wall or lower portion of the dashboard of a vehicle.

FIG. 3 illustrates a cross-sectional side view, along line 3—3 of FIG. 2, of a load distribution panel 16 sandwiched between a panel retainer 12 and the front portion of an airbag 20. FIG. 3 also illustrates the position of an uninflated airbag 20 in relation to the housing 32, inflator 30 and load distribution panel 16. The inflator, illustrated in FIG. 3, is one example a conventional inflator 30.

As seen in FIG. 3, an inflator 30 is attached to a housing 32. The housing 32, in cooperation with the trim cover panel 40, contains the members of the airbag module. The housing secures the components of the airbag module to the vehicle once the airbag module is installed. Housings 32 are common in the industry. Housings 32 may be of a generic shape, or may be designed specifically to fit the design of the lower instrument panel of a particular type of vehicle. A housing 32 allows the components of the airbag module to be assembled at one location and installed in the vehicle at another.

In FIGS. 6 and 7, a trim cover panel 40 is illustrated. The trim cover panel 40 conceals the airbag 20 and other internal components. The trim cover panel 40 also provides a decorative appearance for the installed airbag module. Generally, the trim cover panel 40 is made of pre-formed hard plastic. The trim cover panel 40 may be made of wood, metal, foam, or like materials common in the industry. The shape and size of the trim cover panel 40 generally depends on the size of the assembled airbag module and the size of the area within the lower portion of the instrument panel, which the airbag module is to occupy. A trim cover panel whose shape and appearance may be easily altered allows the airbag system manufacturer to use a common airbag module in a variety of vehicles. For each vehicle model the shape, size and decor of the trim cover panel 40 may be modified.

Alternatively, the present invention allows the functions of the trim cover panel 40 to be incorporated into the load distribution panel 16 such that a separate trim cover panel is not needed. The outface of the load distribution panel 16 may be given an ornamental finish to match the decor of the vehicle into which the assembled airbag module will be installed.

In FIG. 6, one embodiment of an assembled knee airbag module illustrates the knee bolster panel retention apparatus 10. FIG. 6 is a cross-sectional view along line 6—6 of FIG. 5. A housing 32 surrounds the other members of the knee airbag module. The housing 32 in cooperation with the trim cover panel 40 form the outer structure for the knee airbag module. A knee bolster panel retention apparatus 10 which is a single unit allows one manufacturer to assemble the apparatus and another to install the apparatus in a vehicle in assembly line fashion. An inflator 30 is secured to the housing 32. The inflator 30, of conventional design, may be inside an airbag 20, or otherwise operably connected to the airbag 20 such that gas generated by the inflator 30 inflates the airbag 20 during an accident.

The airbag 20 is fabricated to include a panel retainer 12 which is secured to the front central portion of the airbag 20. Securement may be accomplished prior to or during the assembly process. FIG. 6 illustrates how the panel retainer 12 encloses the top and bottom edge of a load distribution panel 16. The load distribution panel 16 is placed between the panel retainer 12 and the front central portion of the airbag 20. The load distribution panel 16 is as long and wide as the front surface of the deflated airbag 20. The load distribution panel 16 may comprise fasteners 18 which pass through the pre-formed apertures 22 (seen in FIG. 5) of the panel retainer 12.

In other embodiments of the present invention, apertures 22 are not necessary as the panel retainer 12 is configured to not obstruct the fasteners 18. The fasteners 18 are conventional fasteners 18 which correspond in position and structure to fastener receiving members 24. The fastener receiving members 24 are preferably formed in the trim cover panel 40. The trim cover panel 40 conceals the internal components of a knee airbag module from the users of the vehicle and provides a decorative appearance for the knee airbag module. FIG. 6 illustrates how the edges of the trim cover panel 40 may be configured to conceal an area larger than the space need to house the main components of the airbag module. This flexibility allows various designs in knee airbag modules to be installed and still not require re-designed trim cover panels 40. Avoiding re-designing the trim cover panels 40 saves the vehicle manufacturer money.

FIG. 7 illustrates an alternative embodiment of the present invention. In FIG. 7, the fasteners 18 are attached to the trim cover panel 40 and the fastener receiving members 24 are formed in the load distribution panel 16. The positioning of the fasteners and fastener receiving members 24 may vary depending on the design of the trim cover panel 40 and needs of the manufacturer.

The present invention, and more particularly the panel retainer 12, provides a simple and effective way to secure a load distribution panel 16 to an airbag 20. The panel retainer 12 of the present invention is a very flexible design which can be adapted to different kinds of airbag modules. The present invention is easy to fabricate, assemble, and uses less parts. Furthermore, the design allows for more efficient and less costly assembly of the components of the airbag module.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by Letters Patent is:

1. An airbag system comprising:
   an airbag; and
   a panel retainer attached to said airbag, wherein at least a portion of said panel retainer extends forward of a rigid load distribution member to couple said rigid load distribution member to said airbag such that said rigid load distribution member moves toward a user in response to inflation of the airbag.

2. An airbag system as defined in claim 1, wherein said panel retainer is a pocket.

3. An airbag system as defined in claim 1, wherein said panel retainer is a strap.

4. An airbag system as defined in claim 1, wherein said rigid load distribution member is a rod.

5. An airbag system as defined in claim 1, wherein said rigid load distribution member is a plate.

6. An airbag system as defined in claim 1, wherein said rigid load distribution member is a panel.

7. An airbag system as defined in claim 1, wherein said panel retainer is two or more straps.

8. A knee bolster airbag system comprising:
   an airbag; and
   a panel retainer connected to the airbag, wherein the panel retainer is shaped to receive and secure a rigid load distribution panel;
   wherein the rigid load distribution panel is disposed between said airbag and said panel retainer.

9. A knee bolster airbag system as defined in claim 8, wherein said panel retainer is a strap.

10. A knee bolster airbag system as defined in claim 9, wherein said strap is secured on three sides to said knee bolster airbag to form a pocket.

11. A knee bolster airbag system as defined in claim 10, wherein said strap is configured to allow placement of said load distribution panel between the knee bolster airbag and the strap.

12. A knee bolster airbag system as defined in claim 11, further comprising one or more holes in said strap, which holes provide passage for fasteners, which fasteners are capable of securing the load distribution panel to a decorative trim cover panel.

13. A knee bolster airbag system as defined in claim 8, wherein said panel retainer forms a sleeve.

14. A knee bolster airbag module comprising:
   a housing which housing is formed with a space configured to receive an inflator;
   an inflator secured to said housing, said inflator configured to discharge gas into an airbag;
   an airbag attached to said inflator such that gas escaping said inflator enters said airbag inflating said airbag;
   a load distribution panel; and
   a panel retainer secured to said airbag, wherein at least a portion of said panel retainer extends forward of said rigid load distribution member to receive and securely hold said load distribution panel.

15. A knee bolster airbag module as defined in claim 14, wherein said panel retainer is attached to said airbag at both ends.

16. A knee bolster airbag module as defined in claim 14, wherein said load distribution panel is generally planar.

17. A knee bolster airbag module as defined in claim 14, wherein said panel retainer is rectangular.

18. A knee bolster airbag module as defined in claim 14, wherein one or more holes are disposed in said panel retainer, which holes provide passage for fasteners, which fasteners secure the load distribution panel to a decorative trim cover panel.

19. A knee bolster airbag module as defined in claim 14, further comprising a second panel retainer said second panel retainer attached to said airbag and configured to cooperate with said panel retainer in securing said load distribution panel.

20. A method for securing a load distribution panel to an airbag, comprising the steps of:
   a) providing an airbag and a panel retainer for receiving and securing a rigid load distribution panel between said airbag and said panel retainer;
   b) securing a load distribution panel to the airbag by way of the panel retainer; and
   c) positioning the load distribution panel such that one or more fasteners disposed in the load distribution panel are capable of attaching to a trim cover panel. and attaching the trim cover panel to the load distribution panel by way of the fasteners disposed in the load distribution panel.

21. The method of claim 20, wherein the fasteners are part of the trim cover panel and the load distribution panel comprises fastener receiving members.

22. The method of claim 20, wherein the fasteners are tree clips, snaps, or rivets.

* * * * *